(12) United States Patent
Fleure et al.

(10) Patent No.: US 9,798,022 B2
(45) Date of Patent: Oct. 24, 2017

(54) SELECTION OF RECEIVER LINE ORIENTATION FOR SEISMIC DATA ACQUISITION ARRAY

(71) Applicant: Global Geophysical Services, Inc., Missouri City, TX (US)

(72) Inventors: Thomas Fleure, Missouri City, TX (US); Hector Enriquez, Katy, TX (US)

(73) Assignee: Global Geophysical Services, Inc., Missouri City, TX (US)

( * ) Notice: Subject to any disclaimer, the term of this patent is extended or adjusted under 35 U.S.C. 154(b) by 94 days.

(21) Appl. No.: 14/630,088

(22) Filed: Feb. 24, 2015

(65) Prior Publication Data
US 2016/0245936 A1 Aug. 25, 2016

(51) Int. Cl.
*G01V 1/00* (2006.01)
(52) U.S. Cl.
CPC .................................... *G01V 1/003* (2013.01)
(58) Field of Classification Search
CPC ....................................................... G01V 1/003
USPC ...................................................... 367/21, 56
See application file for complete search history.

(56) References Cited

U.S. PATENT DOCUMENTS

| | | | |
|---|---|---|---|
| 4,476,552 A | 10/1984 | Waters et al. | |
| 4,933,912 A * | 6/1990 | Gallagher | G01V 1/30 367/56 |
| 5,111,437 A | 5/1992 | Rice | |
| 5,285,423 A | 2/1994 | Zachariadis et al. | |
| 5,402,391 A | 3/1995 | Cordsen | |
| 5,430,689 A | 7/1995 | Rigsby et al. | |
| 5,487,052 A | 1/1996 | Cordsen | |
| 5,648,938 A | 7/1997 | Jakubowicz | |
| 5,787,051 A | 7/1998 | Goodway et al. | |
| 6,028,822 A | 2/2000 | Lansley et al. | |
| 6,977,867 B2 * | 12/2005 | Chamberlain | G01V 1/22 340/855.4 |
| 7,203,600 B2 * | 4/2007 | Keers | G01V 1/28 702/14 |
| 8,416,640 B2 * | 4/2013 | Fleure | G01V 1/3808 367/15 |
| 2009/0279386 A1 * | 11/2009 | Monk | G01V 1/3808 367/21 |
| 2013/0100772 A1 | 4/2013 | Girouard et al. | |

OTHER PUBLICATIONS

"Sobel operator," Wikipedia, Feb. 17, 2014, downloaded Oct. 17, 2016 from https://en.wikipedia.org/w/index.php?title=Sobel_operator&oldid=595856175, 6 pp.*

* cited by examiner

*Primary Examiner* — Daniel L Murphy

(57) ABSTRACT

Methods for selecting a receiver line orientation for a seismic data acquisition array and methods for performing a seismic survey using the selected receiver line orientation are provided herein. A method of selecting a 3D seismic data acquisition array comprising: selecting a survey area, determining the location of a plurality of source lines in the survey area, pre-planning a plurality of receiver line grids with differing orientations, assigning a cell grid to each receiver line grid, generating a fold level for each cell in each receiver line grid, determining a fold variation for each receiver line grid, and selecting a receiver line grid from the plurality of receiver line grids with the lowest fold variation.

20 Claims, 5 Drawing Sheets

SELECTION OF RECEIVER LINE ORIENTATION FOR SEISMIC DATA ACQUISITION ARRAY

BACKGROUND

1. Field of the Invention

The present disclosure relates to seismic data acquisition and processing, and, more specifically, to methods for selecting a receiver line orientation for a seismic data acquisition array and for performing a seismic survey using the selected receiver line orientation.

2. Background of the Invention

Seismic surveying for oil and gas reserves is typically performed by setting out an array of receivers, located along receiver lines, and source points, located along source lines, in an area of interest, and then generating seismic waves at the source points using a variety of seismic sources. The receivers detect the seismic waves and convert the seismic energy to electrical signals which are digitized and processed through computer systems to create an image of the subsurface.

Seismic data acquisition arrays typically have source lines that are orthogonal to the receiver lines, but they may also be parallel to or at a diagonal angle, typically 45 degrees, to the receiver lines. The multiple receiver lines are typically parallel and equally spaced with evenly spaced receivers located along the receiver lines. The multiple source lines are typically parallel and equally spaced with evenly spaced source points located along the source lines.

However, such an ideal seismic data acquisition array may not be possible in reality due to constraints on the location of the source lines. The location of the source lines may be constrained due to, among other reasons, land access restrictions, terrain, and obstacles such as buildings, streams, ponds, lakes, oilfield equipment, and crops. It is desirable to develop methods for selecting a seismic data acquisition array that results in the most uniform fold distribution in an area of interest with constrained source line locations.

BRIEF DESCRIPTION OF THE DRAWINGS

The present disclosure will be more fully understood by reference to the following detailed description of the preferred embodiments of the present disclosure when read in conjunction with the accompanying drawings, in which like reference numbers refer to like parts throughout the views wherein.

Figure 1:
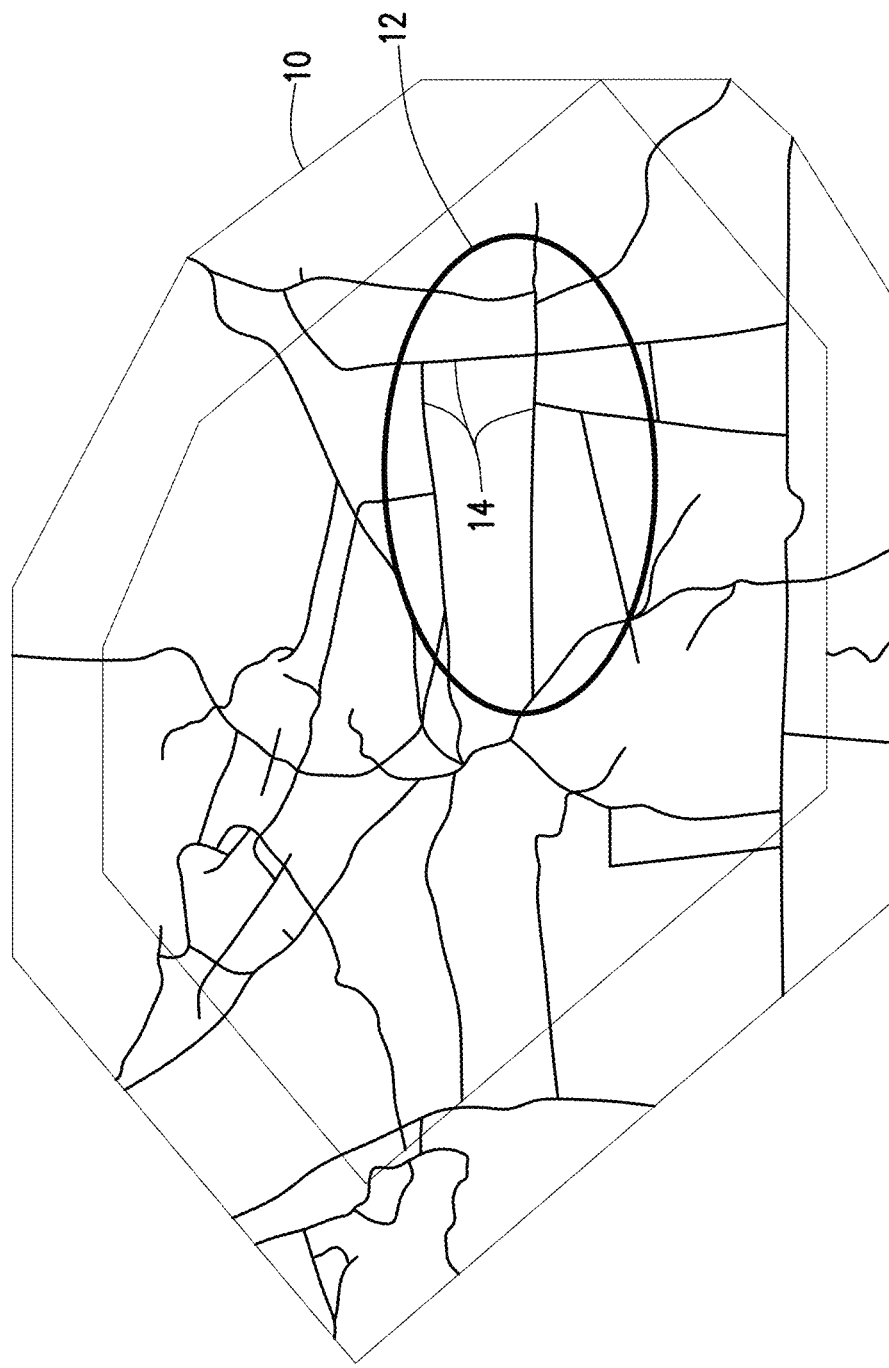
FIG. 1 depicts an area of interest for seismic surveying with source lines in accordance with illustrative embodiments of the present disclosure.
Figure 2A:
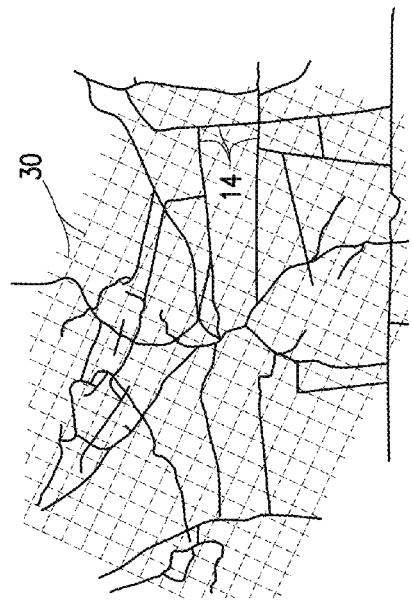
FIGS. 2A-2D depict multiple receiver line grids with different orientations relative to the source lines in accordance with illustrative embodiments of the present disclosure.
Figure 2B:
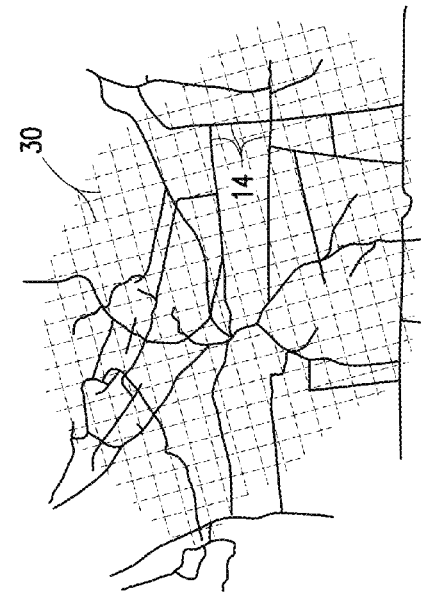
Figure 2C:
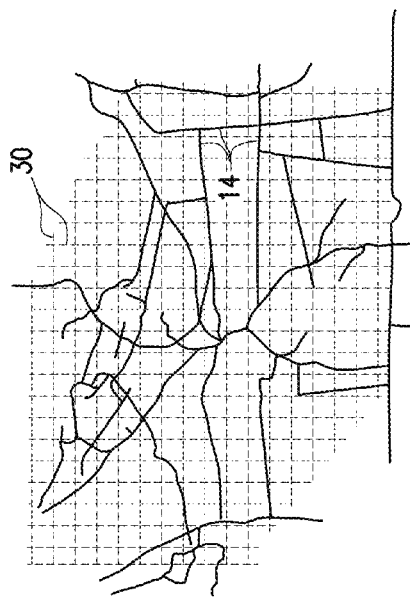
Figure 2D:
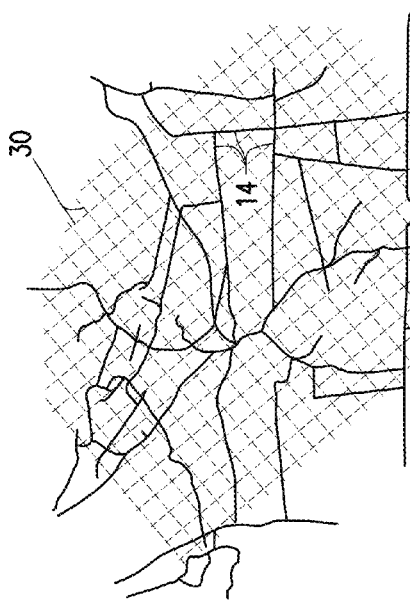

The disclosure may be embodied in other specific forms without departing from the spirit or essential characteristics thereof. The present embodiments are therefore to be considered in all respects as illustrative and not restrictive, the scope of the disclosure being indicated by the appended claims rather than by the foregoing description, and all changes which come within the meaning and range of equivalency of the claims are therefore intended to be embraced therein.

DETAILED DESCRIPTION

Illustrative embodiments of the present disclosure are described in detail herein. In the interest of clarity, not all features of an actual implementation may be described in this specification. It will of course be appreciated that in the development of any such actual embodiment, numerous implementation-specific decisions must be made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure. To facilitate a better understanding of the present disclosure, the following examples of certain embodiments are given. In no way should the following examples be read to limit, or define, the scope of the disclosure.

Reflection seismology is used to obtain images of the geologic layers from the surface of the earth down to subsurface depths of thousands of feet. Controlled seismic sources are used to generate seismic signals at a multitude of source points which are transmitted through the geologic formations in the subsurface of the earth. Changes in the properties of the rocks in these geologic formations result in the seismic energy being partially reflected back to the surface, where it is detected using listening devices known as receivers. The seismic energy travels through the different geologic formations at different velocities, and changes in velocity at interfaces between geologic formations results in reflected energy. The source points and receivers are arranged in an array that allows for the desired seismic data to be acquired. The seismic data are recorded in a digital format and then processed through various software programs to produce maps, subsurface images, 3-dimensional displays of the geologic formations, and other information about the properties of the subsurface of the earth.

An important objective when designing a seismic data acquisition array is the degree of subsurface coverage. Subsurface coverage is measured as the number of source point and receiver combinations which correspond to a given common midpoint between the source point and receiver positions, a value referred to herein as the "fold." A higher fold generally improves data quality as the seismic data is summed together such that the primary signal is enhanced by in-phase addition while ambient noise and interference are reduced. Uniform fold distribution throughout an area of interest is desired as it results in a more even and predictable subsurface resolution. When source lines are limited to specific locations in an area of interest, multiple receiver line grids with different orientations may be tested to determine a receiver line grid with lower relative fold variation that can therefore be used to generate a more even and predictable subsurface image for an area of interest.

FIG. 1 depicts an area of interest for seismic surveying (10) with source lines (14) in accordance with illustrative embodiments of the present disclosure. A survey area (12)

may be selected within the area of interest (10). One or more source lines (14) may be received from within the selected survey area (12). The location of one or more source lines (14) from within the selected survey area (12) may be determined. In certain embodiments, the source lines (14) may be irregularly oriented and/or may form an irregular pattern. In certain embodiments, the source lines (14) may be constrained to roads, trails, or other allowable access paths in the survey area (12). In certain embodiments, the source lines (14) may be substantially non-parallel to one another. For instance, in certain illustrative embodiments, one source line may run substantially in the North-South direction while another source line may run substantially in the East-West direction.

Figure 3:
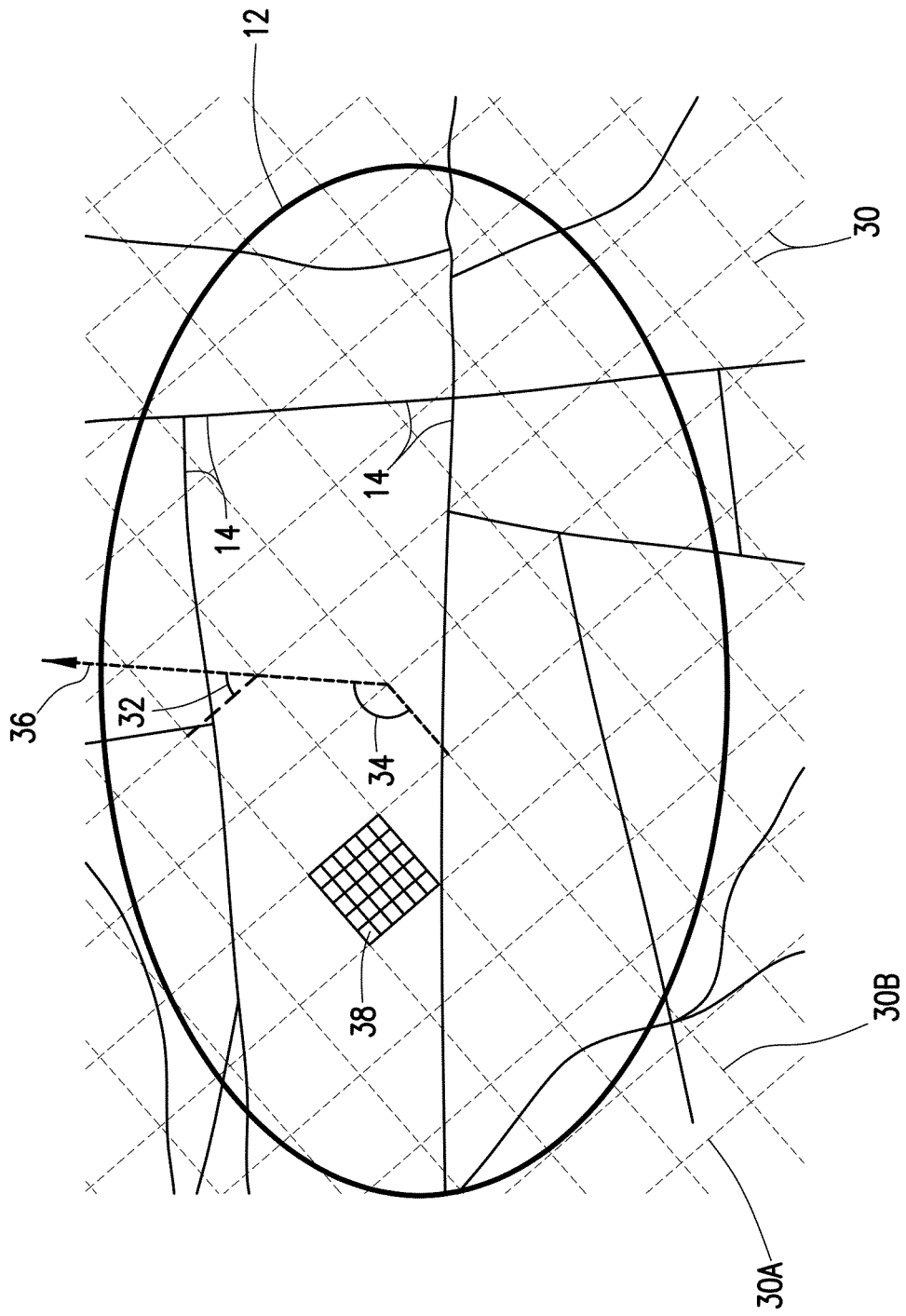
FIG. 3 depicts a receiver line grid having a 45°/135° azimuth orientation in accordance with illustrative embodiments of the present disclosure.

FIGS. 2A-2D depict multiple receiver line grids (30) with different orientations relative to the source lines (14) in accordance with illustrative embodiments of the present disclosure. As shown in FIGS. 2A-2D, multiple receiver line grids (30) each with a different orientation relative to the source lines (14) may be provided and/or pre-planned to cover the survey area (12). As an illustrative embodiment of the present disclosure, FIG. 3 depicts in more detail the receiver line grid of FIG. 2C which has a 45°/135° azimuth orientation. As shown in FIG. 3, a receiver line grid (30) may comprise a first set of receiver lines (30A) that are substantially parallel to one another and a second set of receiver lines (30B) that are substantially parallel to one another.

The second set of receiver lines (30B) may intersect with the first set of receiver lines (30A). In certain embodiments, the second set of receiver lines (30B) may be substantially orthogonal to the first set of receiver lines (30A). In certain embodiments, multiple receivers may be located along the receiver lines (30A, 30B). In certain embodiments, the receivers may be oriented to form a hexagonal grid such that each receiver is equi-distant from six other receivers.

As further shown in FIG. 3, the receiver line grid (30) may be oriented relative to an axis (36) of the survey area (12). In certain embodiments, the alignment of the axis (36) of the survey area (12) may vary. In some embodiments, the axis (36) may be substantially in the North-South direction or the East-West direction. In other embodiments, the axis (36) may be substantially parallel to one or more of the source lines. In certain embodiments, the axis (36) of the survey area (12) may be due north such that the angle relative to the axis (36) is equivalent to degrees azimuth. As shown in FIG. 3, the first set of receiver lines (30A) may be oriented at a first angle (32) relative to the axis (36) of the survey area (12). In certain embodiments, the first angle (32) may be selected from the group consisting of: 0 degrees, 25 degrees, 45 degrees, and 75 degrees azimuth. As also shown in FIG. 3, the second set of receiver lines (30B) may be oriented at a second angle (34) relative to the axis (36) of the survey area (12). In certain embodiments, the second angle (34) may be selected from the group consisting of: 90 degrees, 115 degrees, 135 degrees, and 165 degrees azimuth.

In certain embodiments, the spacing between receiver lines in each set (30A, 30B) may vary from one receiver line grid to another based on, among other factors, the desired fold, the size of the survey area, and the number of receiver lines as will occur to those skilled in the pertinent art, having the benefit of the present disclosure. In certain embodiments, equal spacing between each receiver line in a set of receiver lines (30A, 30B) may be preferred. In certain embodiments, the number of receiver lines in each set of receiver lines (30A, 30B) may vary based on, among other factors, the desired fold, the size of the survey area, and the spacing between the receiver lines as will occur to those skilled in the pertinent art, having the benefit of the present disclosure.

In certain embodiments, multiple source points may be located along the source lines (14) and multiple receivers may be located along the receiver line grid (30). In certain embodiments, a midpoint may be determined for multiple source point and receiver combinations. As used herein, the term "midpoint" refers to a point on the surface halfway between a source point and a receiver recording data from that source point. In certain embodiments, the seismic data or traces detected by a receiver located on a receiver line from a source point may be assigned to a cell in a cell grid (38) based on the midpoint location. As used herein, the term "cell," also referred to as "bin," refers to an area, typically rectangular or square, used to organize seismic data or traces with a common midpoint.

As shown in FIG. 3, a cell grid (38) may divide the 3D selected survey area (12) covered by the source lines (14) and the receiver line grid (30) into a 2D grid of multiple cells. In the interest of clarity, only a portion of the cell grid (38) is illustrated in FIG. 3. In certain embodiments, a cell grid (38) may be assigned to each receiver line grid (30) provided and/or pre-planned. In certain embodiments, multiple receiver line grids with a cell grid may be generated by assigning a cell grid (38) to each receiver line grid (30) provided and/or pre-planned. The cell grid (38) may comprise multiple cells and may have a cell size and/or an orientation.

Figure 4:
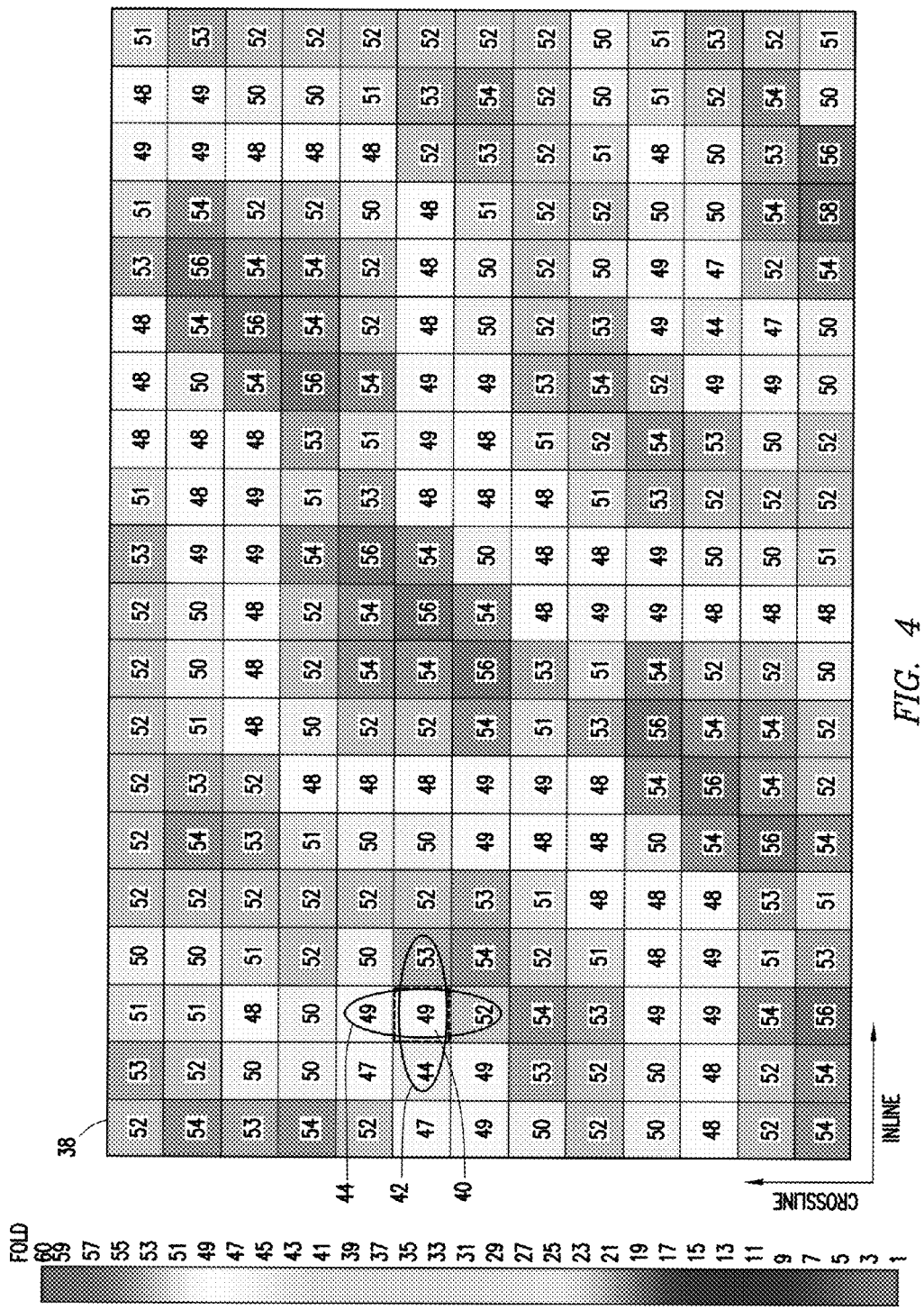
FIG. 4 depicts offset-limited fold levels generated for multiple cells in a receiver line grid in accordance with illustrative embodiments of the present disclosure.

In certain embodiments, a fold level may be generated for each cell in the receiver line grid (30) and associated cell grid (38). As used herein, the term "fold level" refers to the number of source point and receiver combinations which correspond to a given common midpoint between the source point and receiver positions. FIG. 4 depicts offset-limited fold levels generated for multiple cells in a receiver line grid in accordance with illustrative embodiments of the present disclosure. As used herein, the term "offset" refers to the surface distance between a source point located on a source line and a receiver located on the receiver line grid. In this example, the offset was limited to 1280 meters. As illustrated in FIG. 4, the fold level for each cell may be represented by a numeric value or by a relative scale (e.g., color scale). In certain embodiments, the fold level may be generated using computer software. One example of commercially available computer software is MESA Survey Design Software, available from ION Geophysical Corporation, Houston, Tex.

In certain embodiments, a fold variation may be determined for each receiver line grid provided and/or pre-planned. In some embodiments, the fold variation for each receiver line grid may be determined by first calculating the fold variation for each cell in the receiver line grid and then averaging the fold variations of all of the cells in the receiver line grid. In such embodiments, the fold variation for a cell (40) may be the average percentage difference between fold levels in adjacent cells (42, 44). In certain embodiments, the fold variation for each cell may be calculated according to the following equation:

$$(|F_C-F_{C1}|+|F_C-F_{C2}|+|F_C-F_{C3}|+|F_C-F_{C4}|) \div 4F_C \times 100$$

wherein $F_C$ is the fold level of the cell for which the fold variation is being calculated (40), and wherein $F_{C1}$, $F_{C2}$, $F_{C3}$, and $F_{C4}$ are the fold levels of adjacent cells (42, 44). As illustrated in FIG. 4, the adjacent cells (42, 44) may be the cells immediately above, below, to the left, and/or to the right of the cell for which the fold variation is being calculated. In certain embodiments, an inline fold variation using adjacent cells in the inline direction (42) and a crossline fold variation using adjacent cells in the crossline direction (44) may be calculated for each cell (40). In certain embodiments, the inline fold variation and crossline fold variation may be calculated according to the following equation:

$$(|F_C - F_{C1}| + |F_C - F_{C2}|) \div 2F_C \times 100$$

wherein $F_C$ is the fold level of the cell for which the fold variation is being calculated (40), and wherein $F_{C1}$ and $F_{C2}$ are the fold levels of adjacent cells in the inline direction (42) or in the crossline direction (44).

Figure 5A:
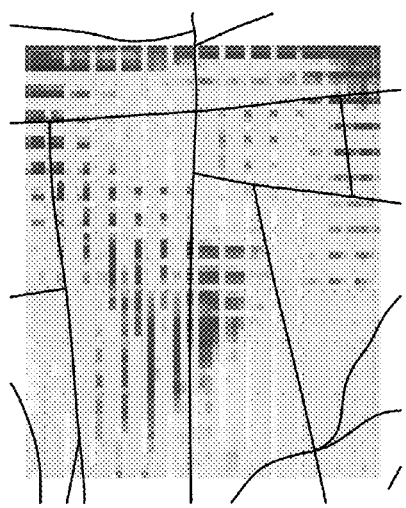
FIGS. 5A-5D depict offset-limited fold levels generated for multiple cells in a selected survey area for four different receiver line grids, each with a different orientation in accordance with illustrative embodiments of the present disclosure.
Figure 5B:
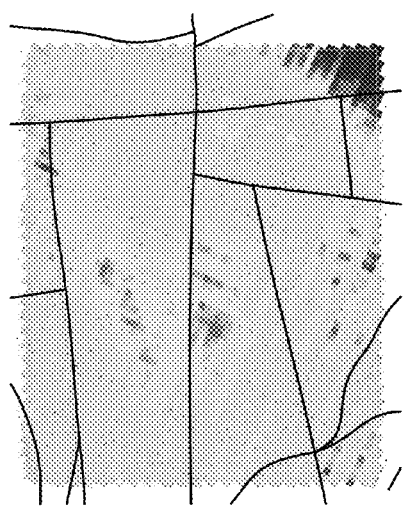
Figure 5C:
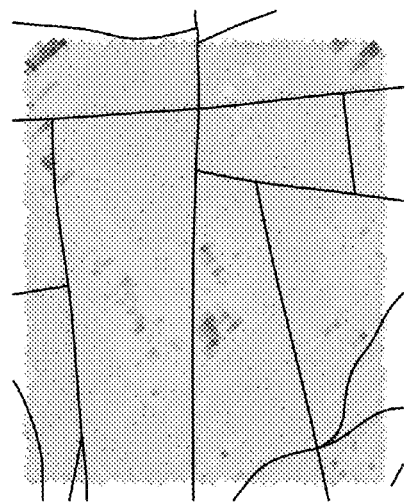
Figure 5D:

In other embodiments, the fold variation for each receiver line grid may be determined by analyzing and comparing the variation of the fold levels over all cells in a receiver line grid to that of another receiver line grid having a different orientation. In certain embodiments, the receiver line grids may be ranked relative to one another based on the uniformity of the fold levels over the selected survey area. For example, FIGS. 5A-5D depict offset-limited fold levels generated for multiple cells in a selected survey area for four different receiver line grids each with a different orientation in accordance with illustrative embodiments of the present disclosure. In this example, the offset was limited to 1280 meters. The fold levels of the cells in the receiver line grids of FIGS. 5A-5D are represented using a color scale. In this example, the receiver line grid of FIG. 5C shows the lowest fold variation, indicated qualitatively as having the least amount of color darkness, while the receiver line grid of FIG. 5A shows the highest fold variation, indicated qualitatively as having the highest amount of color darkness.

In certain embodiments, a receiver line grid may be selected from the receiver line grids provided based, at least in part, on the fold variations of the receiver line grids. In certain embodiments, the selected receiver line grid may have the lowest fold variation of all the receiver line grids provided.

In certain embodiments, the cell size and/or the orientation of the cell grid assigned to one or more of the receiver line grids may be varied to form a second cell grid. In certain embodiments, the second cell grid may be assigned to the receiver line grids provided and/or pre-planned. In certain embodiments, a fold level may be generated for multiple cells in each receiver line grid using the second cell grid. In certain embodiments, a fold variation may be determined for each receiver line grid based on the generated fold levels. In certain embodiments, a receiver line grid may be selected from the receiver line grids with a second cell grid based, at least in part, on the fold variations of the receiver line grids. In such embodiments, the selected receiver line grid may have the lowest fold variation of the receiver line grids with a second cell grid.

In certain embodiments, the selected receiver line grid may be used to perform a seismic survey. In certain embodiments, seismic signals may be generated at multiple source points located along the source lines. For purposes of this disclosure, a seismic signal may be generated using any seismic source having the capacity to impart impacts or mechanical vibrations at or near the surface of the earth. Seismic sources suitable for use in the methods of the present disclosure may include, but are not limited to, dynamite, accelerated weight drop, and seismic vibrators. Various other seismic sources may also be used to generate seismic signals as will occur to those skilled in the pertinent art, having the benefit of the present disclosure. In certain embodiments, the source points may be evenly spaced along the source lines.

In certain embodiments, the seismic signals may be detected by multiple receivers located along the selected receiver line grid. For the purposes of this disclosure, a receiver may be any device having the capacity to receive seismic signals. Receivers suitable for use in the methods of the present disclosure include, but are not limited to, geophones, hydrophones, and accelerometers. Various other sensors may also be used to detect a seismic signal as will occur to those skilled in the pertinent art, having the benefit of the present disclosure. In certain embodiments, the receivers may be evenly spaced along the receiver line grid. In certain embodiments, the receivers may convert the seismic energy to electrical signals which may be digitized and processed through computer systems to create an image of the subsurface.

In accordance with an illustrative implementation of the present disclosure, a survey area may be selected from an area of interest. The location of one or more source lines within the survey area may be determined. Multiple receiver line grids may be provided and/or pre-planned with each receiver line grid having a different orientation. Each receiver line grid may comprise two sets of receiver lines that intersect with one another. A cell grid may be assigned to each receiver line grid. Each cell grid may comprise a plurality of cells and may have a cell size and/or an orientation. A fold level may be generated for each cell in the receiver line grids, and the fold variation for each receiver line grid may be determined. The receiver line grid with the lowest fold variation may be selected for performing a seismic survey. The cell size and/or the orientation of the cell grid assigned to one or more of the receiver line grids may be varied. A second fold level may be generated for each cell with a varied cell size and/or orientation and a second fold variation may be determined based on the generated second fold level for each receiver grid line. A second receiver line grid with the lowest second fold variation may be selected for performing a seismic survey. A seismic survey may be performed using the selected receiver line grid and/or the selected second receiver line grid. Multiple source points may be located along the source lines within the survey area. Multiple receivers may be located along the selected receiver line grid and/or the selected second receiver line grid. A seismic signal may be generated at each of the source points using a seismic source and may be detected by the receivers. The seismic signals may be converted to electrical signals which may be digitized and processed through computer systems to create an image of the subsurface.

To facilitate a better understanding of the present disclosure, the following examples of certain aspects of preferred embodiments are given. The following examples are not the only examples that could be given according to the present disclosure and are not intended to limit the scope of the disclosure or claims.

EXAMPLES

Example 1

The following example demonstrates the selection of a receiver line grid orientation based on fold variation according to an embodiment of the present disclosure. As shown in FIGS. 2A-2D, four receiver line grids each with a differing orientation were provided. A cell grid was assigned to each receiver line grid and a fold level was generated for each cell in the receiver line grid. FIGS. 5A-5D show the fold levels of the cells using a color scale. Using the associated numerical values, the fold variation for each cell was calculated in both the inline direction and the crossline direction. As shown in Table 1, the fold variations of all of cells in each receiver line grid were averaged in both the inline direction and the crossline direction, and the fold variation for each receiver line grid was determined. As shown in Table 1, the 45°/135° receiver line grid orientation may be selected according to an embodiment of the present disclosure because it has the lowest fold variation.

TABLE 1

| Receiver Line Grid | Receiver Line Grid Orientation | Fold Variation in Crossline Direction | Fold Variation in Inline Direction | Fold Variation |
|---|---|---|---|---|
| A | 0°/90° Orientation | 14.3% | 27.5% | 20.9% |
| B | 25°/115° Orientation | 6.7% | 9.7% | 8.2% |
| C | 45°/135° Orientation | 6.2% | 8.0% | 7.1% |
| D | 75°/165° Orientation | 19.6% | 10.7% | 15.2% |

Example 1 demonstrates that the orientation of a receiver line grid relative to the source lines may affect the fold variation and thus may affect the quality of subsurface resolution generated using the receiver line grid. Example 1 also demonstrates that the fold variation may be significantly higher when the receiver grid line is oriented such that the receiver lines run substantially parallel to the source lines. For example, the average fold variation in the inline direction for the 0°/90° receiver line grid orientation is higher than the other fold variations, which may suggest that many of the source lines in the selected survey area run substantially in the inline direction.

Therefore, the present disclosure is well-adapted to carry out the objects and attain the ends and advantages mentioned as well as those which are inherent therein. While the disclosure has been depicted and described by reference to exemplary embodiments of the disclosure, such a reference does not imply a limitation on the disclosure, and no such limitation is to be inferred. The disclosure is capable of considerable modification, alternation, and equivalents in form and function, as will occur to those ordinarily skilled in the pertinent arts and having the benefit of this disclosure. The depicted and described embodiments of the disclosure are exemplary only, and are not exhaustive of the scope of the disclosure. Consequently, the disclosure is intended to be limited only by the spirit and scope of the appended claims, giving full cognizance to equivalents in all respects. The terms in the claims have their plain, ordinary meaning unless otherwise explicitly and clearly defined by the patentee.

What is claimed is:

1. A method for selecting a receiver line grid for performing seismic exploration comprising:
   determining the location of a plurality of source lines in a survey area, wherein the source lines form an irregular pattern;
   determining a fold variation for each of a plurality of receiver line grids and associated cell grids, wherein each receiver line grid is positioned in the survey area and has a differing orientation relative to the source lines and wherein each cell grid comprises a plurality of cells; and
   selecting a receiver line grid and associated cell grid from the plurality of receiver line grids and associated cell grids for performing seismic exploration in the survey area based on the determined fold variations of the receiver line grids and associated cell grids, said selected receiver line grid and associated cell grid having a lower relative fold variation.

2. The method of claim 1 wherein the source lines are constrained to roads, trails, or other allowable access paths in the survey area.

3. The method of claim 1 wherein the receiver line grids are defined by receivers oriented such that each receiver is equi-distant from six other receivers.

4. The method of claim 1 wherein each receiver line grid comprises:
   a first plurality of receiver lines, wherein the first plurality of receiver lines are substantially parallel to one another; and
   a second plurality of receiver lines, wherein the second plurality of receiver lines are substantially parallel to one another,
   wherein the second plurality of receiver lines intersects with the first plurality of receiver lines.

5. The method of claim 1 wherein determining the fold variation for a plurality of receiver line grids and associated cell grids comprises:
   calculating the fold variation for each cell in each receiver line grid and associated cell grid; and
   averaging the fold variations of all cells in each receiver line grid and associated cell grid.

6. The method of claim 5 wherein the fold variation for each cell is calculated according to the following equation:

$$(|F_C - F_{C1}| + |F_C - F_{C2}| + |F_C - F_3| + |F_C - F_4|) \div 4F_C \times 100$$

wherein $F_C$ is the fold level of the cell for which the fold variation is being calculated; and
   wherein $F_{C1}$, $F_{C2}$, $F_{C3}$, and $F_{C4}$ are the fold levels of adjacent cells.

7. The method of claim 5 wherein the fold variation for each cell is calculated according to the following equation:

$$(|F_C - F_{C1}| + |F_C - F_{C2}|) \div 2F_C \times 100$$

wherein $F_C$ is the fold level of the cell for which the fold variation is being calculated; and
   wherein $F_{C1}$ and $F_{C2}$ are the fold levels of adjacent cells in the inline direction or the crossline direction.

8. A method of selecting a 3D seismic data acquisition array comprising:
   selecting a survey area;
   determining the location of a plurality of source lines in the survey area wherein the source lines form an irregular pattern;
   pre-planning a plurality of receiver line grids, wherein each receiver line grid has a differing orientation relative to the source lines;
   generating a plurality of receiver lines with a first cell grid by assigning a first cell grid to each receiver line grid, wherein each first cell grid comprises a plurality of cells and wherein each first cell grid has a cell size and an orientation;
   generating a fold level for a plurality of cells in each receiver line grid with a first cell grid;
   determining a fold variation for each receiver line grid with a first cell grid; and
   selecting a receiver line grid from the plurality of receiver line grids with a first cell grid based on the fold variation, said selected receiver line grid with a first cell grid having a lower relative fold variation.

9. The method of claim 8 further comprising:
   varying at least one of the cell size and the orientation of the first cell grid to form a second cell grid;

generating a plurality of receiver line grids with said second cell grid by assigning said second cell grid to each receiver line grid;

generating a fold level for a plurality of cells in each receiver line grid with said second cell grid;

determining a fold variation for each receiver line grid with said second cell grid; and selecting a receiver line grid from the plurality of receiver line grids with said second cell grid based on the fold variation, said selected receiver line grid with a second cell grid having a lower relative fold variation.

10. The method of claim 8 wherein the source lines are irregularly oriented.

11. The method of claim 8 wherein the source lines are constrained to roads, trails, or other allowable access paths in the survey area.

12. The method of claim 8 wherein the receiver line grids are defined by receivers oriented such that each receiver is equi-distant from six other receiver.

13. The method of claim 8 wherein each receiver line grid comprises:

a first plurality of receiver lines, wherein the first plurality of receiver lines are substantially parallel to one another; and a second plurality of receiver lines, wherein the second plurality of receiver lines are substantially parallel to one another, wherein the second plurality of receiver lines intersects with the first plurality of receiver lines.

14. The method of claim 13 wherein the second plurality of receiver lines is substantially orthogonal to the first plurality of receiver lines.

15. The method of claim 13 wherein the first plurality of receiver lines is oriented at a first angle relative to an axis or the survey area and wherein the second plurality of receiver lines is oriented at a second angle relative to the axis of the survey area.

16. The method of claim 8 wherein determining the fold variation for each receiver line grid comprises:

calculating the fold variation for each cell in each receiver line grid; and averaging the fold variations of all cells in each receiver line grid.

17. The method of claim 16 wherein the fold variation for each cell is calculated according to the following equation:

$$(|F_C-F_{C1}|+|F_C-F_{C2}|+|F_C-F_3|+|F_C-F_4|) \div 4F_C \times 100$$

wherein $F_C$ is the fold level of the cell for which the fold variation is being calculated; and wherein $F_{C1}$, $F_{C2}$, $F_{C3}$, and $F_{C4}$ are the fold levels of adjacent cells.

18. The method of claim 16 wherein the fold variation for each cell is calculated according to the following equation:

$$(|F_C-F_{C1}|+|F_C-F_{C2}|) \div 2F_C \times 100$$

wherein $F_C$ is the fold level of the cell for which the fold variation is being calculated; and wherein $F_{C1}$ and $F_{C2}$ are the fold levels of adjacent cells in the inline direction or the crossline direction.

19. A method of performing a seismic survey comprising:

selecting a survey area, wherein the survey area has an axis;

determining the location of a plurality of source lines in the survey area wherein the source lines form an irregular pattern;

pre-planning a plurality of receiver line grids, wherein each receiver line grid has a differing orientation relative to the axis;

assigning a cell grid to each receiver line grid, wherein each cell grid comprises a plurality of cells and wherein each cell grid has a cell size and an orientation;

generating a fold level for each cell in each receiver line grid;

determining a fold variation for each receiver line grid;

selecting a receiver line grid from the plurality of receiver line grids based on the determined fold variation, said selected receiver line grid having a lower relative fold variation;

generating seismic signals at a plurality of source points, wherein the source points are located along the source lines; and detecting the seismic signals at a plurality of receivers, wherein the receivers are located along the selected receiver line grid.

20. The method of claim 19 further comprising:

varying at least one of the cell size and the orientation of the cell grid assigned to each receiver line grid;

generating a second fold level for each cell with a varied cell size of orientation in each receiver line grid;

determining a second fold variation based on the generated second fold levels for each receiver line grid;

selecting a second receiver line grid from the plurality of receiver line grids based on the second fold variation;

generating seismic signals at a plurality of source points, wherein the source points are located along the source lines; and detecting the seismic signals at a plurality of receivers, wherein the receivers are located along the selected second receiver line grid.

* * * * *